United States Patent
Tung et al.

(10) Patent No.: US 10,381,825 B2
(45) Date of Patent: Aug. 13, 2019

(54) BATTERY ASSEMBLY DEVICE WITH CHARGING AND DISCHARGING PROTECTION

(71) Applicant: ELMATEK INTERNATION CORP., San Jose, CA (US)

(72) Inventors: Kung-Chao Tung, San Jose, CA (US); Steven Po-Cheng Tung, San Jose, CA (US)

(73) Assignee: ELMATEK INTERNATION CORP., San Jose, CA (US)

(*) Notice: Subject to any disclaimer, the term of this patent is extended or adjusted under 35 U.S.C. 154(b) by 309 days.

(21) Appl. No.: 15/492,269

(22) Filed: Apr. 20, 2017

(65) Prior Publication Data
US 2018/0102641 A1    Apr. 12, 2018

(30) Foreign Application Priority Data
Oct. 11, 2016 (TW) .............................. 105132690 A

(51) Int. Cl.
*H02J 7/00* (2006.01)
*H01M 2/10* (2006.01)
*B60L 58/10* (2019.01)
*H02H 9/04* (2006.01)
*H01M 10/42* (2006.01)
*H01M 2/34* (2006.01)

(52) U.S. Cl.
CPC .............. *H02H 9/045* (2013.01); *B60L 58/10* (2019.02); *H01M 2/1077* (2013.01); *H01M 2/34* (2013.01); *H01M 10/42* (2013.01); *H02J 7/00* (2013.01); *H01M 2200/00* (2013.01); *H01M 2220/20* (2013.01)

(58) Field of Classification Search
CPC ...... H02J 7/0016; H02J 7/0026; H02J 7/0029; H02J 7/00
USPC ......................................................... 320/122
See application file for complete search history.

(56) References Cited

U.S. PATENT DOCUMENTS 3,348,117 A * 10/1967 Howden .................. H02H 7/18
307/77
4,303,877 A * 12/1981 Meinhold ........... H01M 10/441
320/122

(Continued)

*Primary Examiner* — Dharti H Patel
(74) *Attorney, Agent, or Firm* — Chung-Ming Shih

(57) ABSTRACT

A battery assembly device with charging and discharging protection is provided. The aforementioned device includes a plurality of serially connected battery modules and each of the battery module further includes one or a plurality of battery units, a plurality of serially connected first diodes which are parallel connected with the battery unit, a protection circuit including a second diode and third diode which are parallel connected to each other, and a fourth diode. Aforementioned protection circuit is serially connected with the battery unit and configured between two connection points of the battery module, electrode polarity of the second diode and electrode polarity of third diode at connection point are different, and the fourth diode are configured between the two connection points of the battery module and its electrode polarity are different with the connection point of the battery unit. Aforementioned device enables the specific circuit loop formed by specific diodes to bypass the disabled battery unit so as to avoid the disabled battery unit effecting the operation of whole battery assembly device.

11 Claims, 6 Drawing Sheets

(56) References Cited

U.S. PATENT DOCUMENTS

| | | | | | |
|---|---|---|---|---|---|
| 4,713,597 | A | * | 12/1987 | Altmejd | H02J 7/0026 320/122 |
| 4,719,401 | A | * | 1/1988 | Altmejd | H01M 10/4207 320/122 |
| 5,180,641 | A | * | 1/1993 | Burns | H01M 2/34 429/1 |
| 2011/0089909 | A1 | * | 4/2011 | Higashi | H02J 7/0016 320/166 |
| 2015/0130421 | A1 | * | 5/2015 | Bevilacqua, III | H02J 7/0016 320/122 |

* cited by examiner

BATTERY ASSEMBLY DEVICE WITH CHARGING AND DISCHARGING PROTECTION

CROSS-REFERENCE TO RELATED APPLICATION

This application claims priority benefit of TW Patent Application Ser. No. 105132690 filed 2016 Oct. 11 which is hereby incorporated herein by reference its entirety.

BACKGROUND OF THE INVENTION

1. Field of the Invention

The present invention generally relates to a battery assembly device, in particular to a battery assembly device with charging and discharging protection.

2. Description of the Related Art

In order to satisfy operating voltage requirement of various electronic devices, current electronic technology uses a plurality of batteries connected in series to provide a specific operating voltage. However, if any one of the batteries of the conventional serially connected battery assembly device malfunctions (e.g. one battery runs down or gets disabled), the power supply of the electronic device is immediately influenced (the electronic device cannot be powered by the battery assembly).

Besides, the battery assemblies of some special electronic devices, such electric vehicle and aircraft, etc., may malfunction duo to collision, aging or other factors.

Moreover, after some batteries are disabled, the aforementioned battery assembly device may no longer provide the desired operating voltage; therefore, the electronic device adopting the aforementioned battery assembly device may not work normally since the electronic device fails to be powered by the desired operating voltage.

Therefore, it has become an important issue to provide a battery device capable of automatically bypassing some disabled batteries in the serially connected battery structure.

SUMMARY OF THE INVENTION

Therefore, it is a primary objective of the present invention to provide a battery assembly device with charging and discharging protection in order to automatically bypass some disabled batteries in the serially connected battery structure.

To achieve the foregoing objective, the present invention provides a battery assembly device with charging and discharging protection. The device includes a plurality of serially connected battery modules and each of the battery modules further includes one or a plurality of battery units, a plurality of serially connected first diodes which are parallel connected with the battery unit, a protection circuit including a second diode and third diode which are parallel connected to each other, and a fourth diode. The protection circuit is serially connected with the battery unit and configured between the first connection point and the second connection point of the battery module. The electrode polarity of the second diode and electrode polarity of third diode at connection point are inverse to each other, and the fourth diode are configured between the first connection point and the second connection point and its electrode polarity are inverse to the connection point of the battery unit.

To sum up, when some battery units malfunction, the battery assembly device with charging and discharging protection according to the present invention can enable a circuit loop formed by the first diode and the second diode in charging status to bypass the disabled battery units; on the contrary, the battery assembly device can enable a circuit loop formed by the third diode and the fourth diode in discharging status to bypass the disabled battery units; in this way, the operation of whole battery assembly device will not be influenced by the disabled battery units.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

The technical content of the present invention will become apparent by the detailed description of the following embodiments and the illustration of related drawings as follows.

Figure 1:
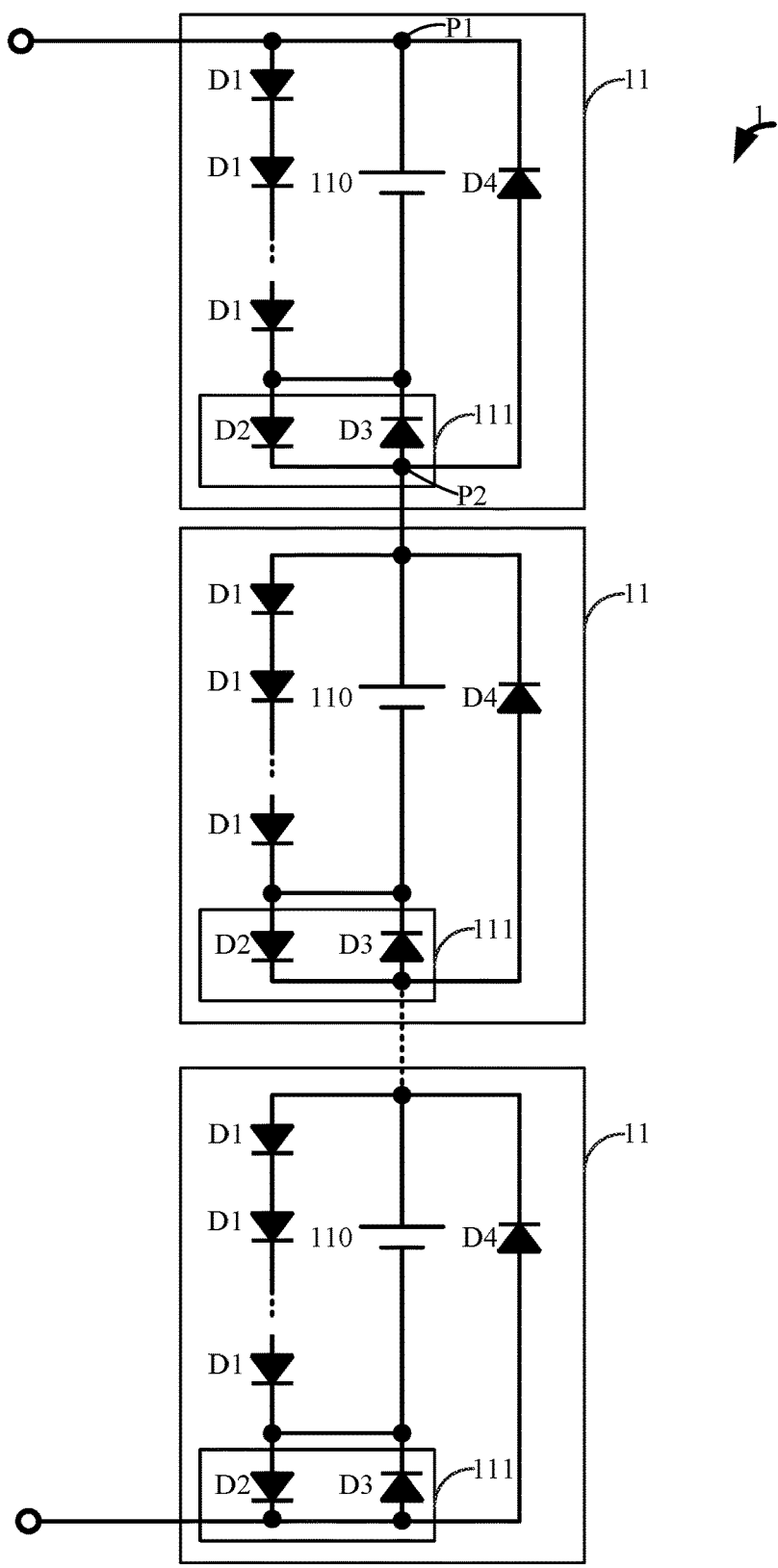
FIG. 1 is a schematic view of a circuit of a battery assembly device with charging and discharging protection of a first embodiment in accordance with the present invention.

Please refer to FIG. 1, which is a schematic view of a circuit of a battery assembly device 1 with charging and discharging protection of a first embodiment in accordance with the present invention. The battery assembly device 1 includes a plurality of serially connected battery modules 11 and each of the battery modules 11 further includes one or a plurality of battery units 110 connected to one another (serial connection, parallel connection, series-parallel connection, etc.), a plurality of serially connected first diodes D1, a protection circuit 111 (including a second diode D2 and a third diode D3), and a fourth diode D4. The serially connected first diodes D1 are connected to the battery unit 10 in parallel. The protection circuit 111 is connected to the battery unit 110 in parallel, and configured between the first connection point P1 and the second connection point P2 of the battery module 11. The protection circuit 111 further includes the second diode D2 and the third diode D3 connected to each other in parallel, and the electrode polarity of the second diode D2 and electrode polarity of the third diode D3 at connection point are inverse to each other; for example, the positive electrode of the second diode D2 (anode) is connected to the negative electrode (cathode) of the third diode D3, and the negative electrode of the second diode D2 is connected to the positive electrode of the third diode D3. Further, the fourth diode D4 are configured between the first connection point P1 and the second connection point P2 and its electrode polarity are inverse to the connection point of the battery unit 110; for example, the negative electrode of the fourth diode D4 is connected to the positive electrode of the battery unit 110.

In another preferred embodiment, the electrode polarity of the first diode D1 and electrode polarity of the second diode D2 at connection point of the batter unit 110 are the same with each other; for example, the positive electrode of the first diode D1 is connected to the positive electrode of the battery unit 110.

In another preferred embodiment, the sum of forwarding bias voltage of the first diodes D1 are greater than voltage of the battery unit 110. In another preferred embodiment, the number of the first diodes D1 is used to configure the sum of forwarding bias voltage of the first diodes D1 to greater than the voltage of the battery unit 110. For instance, if the battery unit 110 is a lithium battery (the output voltage is 3.6V), and the forward bias voltage of each of the first diodes D1 is 0.7V, the sum of forward bias voltage of the first diodes D1 connected in series should be higher than 3.6V in order to avoid that the first diodes D1 are turned on by the battery; thus, the number N of the first diodes D1 connected in series is N≥6. In practice, it is proper to choose to use 6-8 diodes; the sum of the forward bias voltage of 6 diodes is 0.7V×6=4.2V; the sum of the forward bias voltage of 7 diodes is 0.7V×7=4.9V; the sum of the forward bias voltage of 8 diodes is 0.7V×8=5.6V.

The aforementioned diodes may be general purpose diode (the forward bias voltage is 0.7V). In another preferred embodiment, the second diode D2, the third diode D3 and the fourth diode D4 may be Schottky diode (the forward bias voltage is 0.2V), which is a preferred combination; besides, it is also feasible to choose the diodes with lower forward bias voltage.

In another preferred embodiment, the electrode polarity of the third diode D3 and electrode polarity of the fourth diode D4 at the connection point are the same with each other; for example, the positive electrode of the third diode D3 is connected to the positive electrode of the fourth diode D4.

In another preferred embodiment, the electrode polarity of the second diode D2 and electrode polarity of the fourth diode D4 at the connection point are inverse to each other; for example, the negative electrode of the second diode D2 is connected to the positive electrode of the fourth diode D4.

In another preferred embodiment, the protection circuit 111 is connected to the negative electrode of the battery unit 110.

Figure 2:
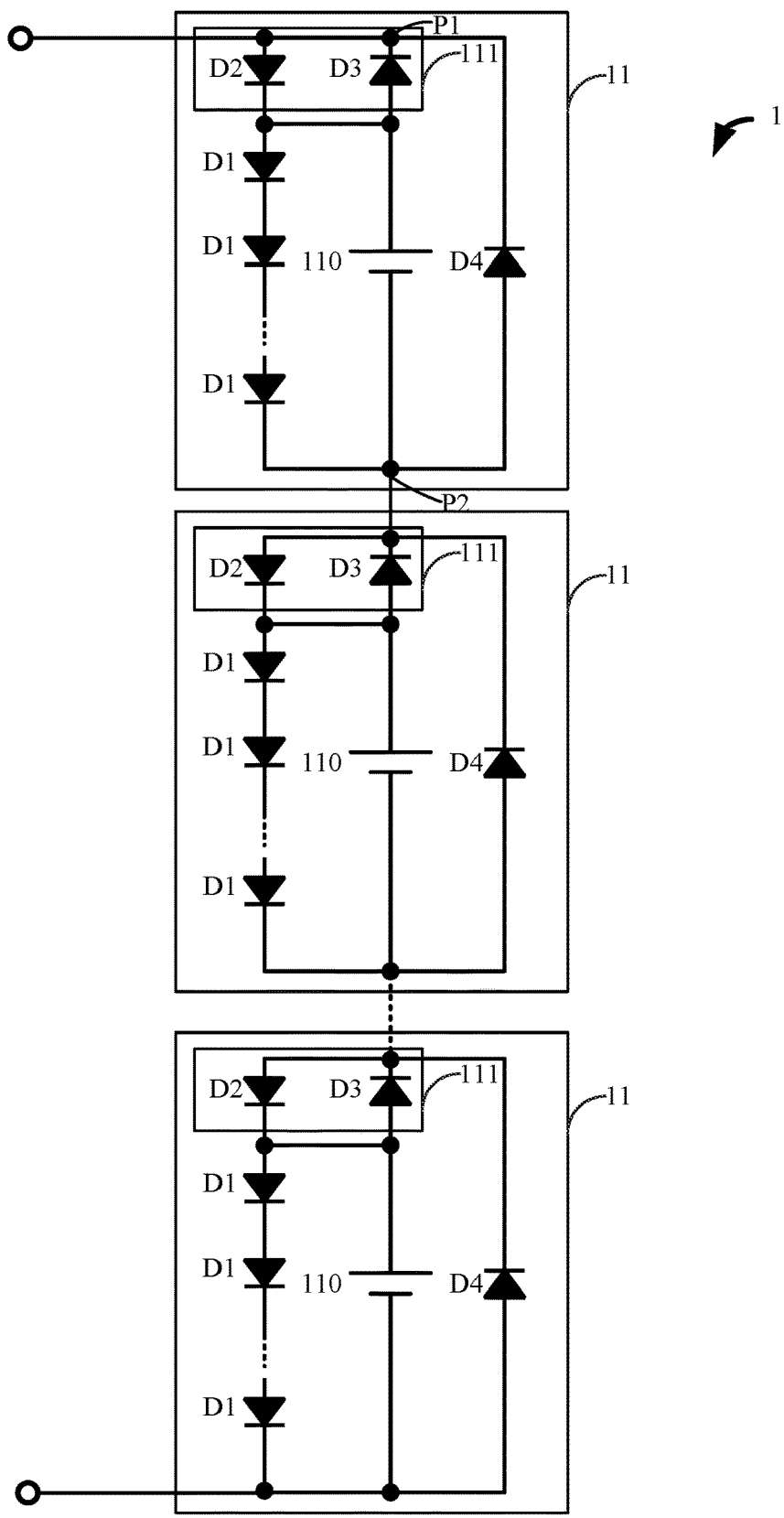
FIG. 2 is a schematic view of a circuit of a battery assembly device with charging and discharging protection of a second embodiment in accordance with the present invention.

Please refer to FIG. 2, which is a schematic view of a circuit of a battery assembly device 1 with charging and discharging protection of a second embodiment in accordance with the present invention. The second embodiment is similar to the first embodiment; the only difference between the first embodiment and the second embodiment is that the protection circuit 111 is connected to the positive electrode of the batter unit 110.

The following content illustrates the charging and discharging protection mechanism of the battery assembly device 1 of the first embodiment in accordance with the present invention; the second embodiment can also achieve the same or similar technical effects. The battery assembly device 1 with a plurality of battery modules 11 (numbered as G1-G3) connected in series will be illustrated first.

Figure 3:
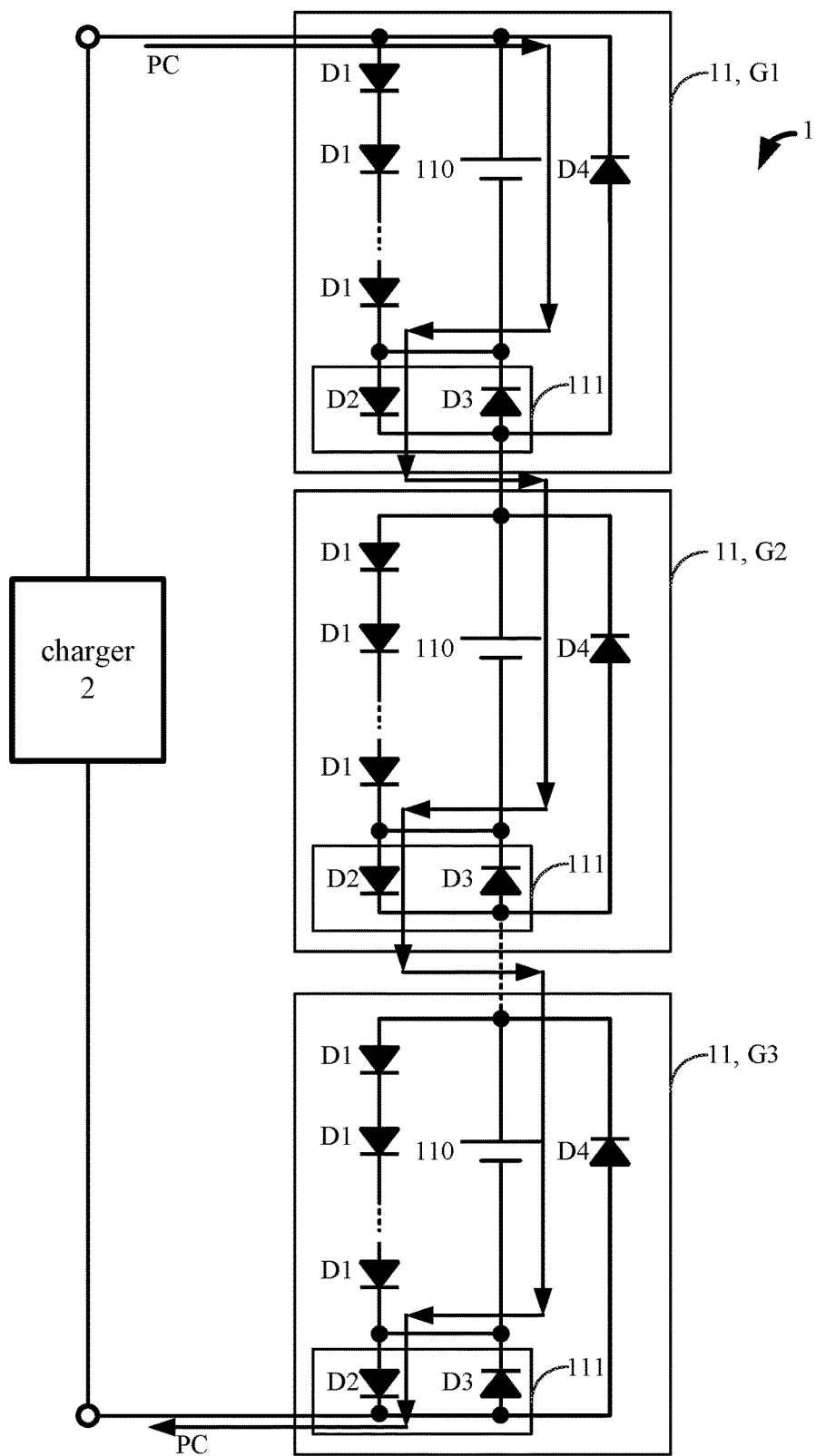
FIG. 3 is a schematic view of a charging path of the first embodiment when all battery units work normally.

Please refer to FIG. 3, which is a schematic view of a charging path PC when all battery units 110 work normally. When multiple battery modules 11 connected in series are configured at two ends of a charger 2, the charging path PC is formed between the battery unit 110 of the first battery module G1, the second diode D2 of the first battery module G1, the battery unit 110 of the second battery module G2, the second diode D2 of the second battery module G2, the battery unit 110 of the third battery module G3 and the second diode D2 of the third battery module G3 after the charging current is applied to the charger 2.

Figure 4:
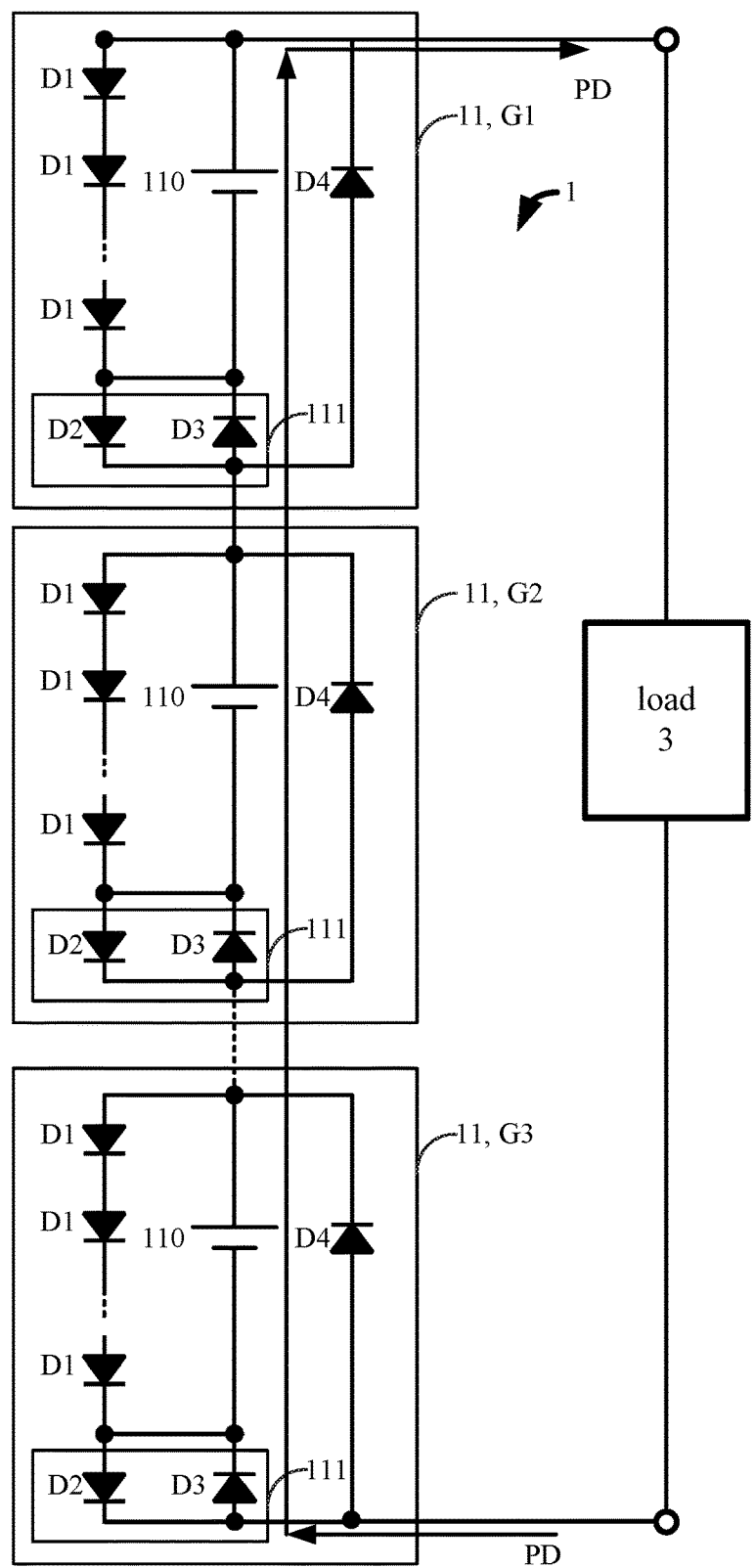
FIG. 4 is a schematic view of a discharging path of the first embodiment when all battery units work normally.

Please refer to FIG. 4, which is a schematic view of a discharging path PD when all battery units 110 work normally. When multiple battery modules 11 (the first battery module G1, the second battery module G2 and the third battery module G3) connected in series are configured at two ends of a load 3, the discharging path PD formed by the generated discharging current is between the load 3, the third diode D3 and the batter unit 110 of the third battery module G3, the third diode D3 and the batter unit 110 of the second battery module G2, and the third diode D3 and the batter unit 110 of the first battery module G1.

Figure 5:
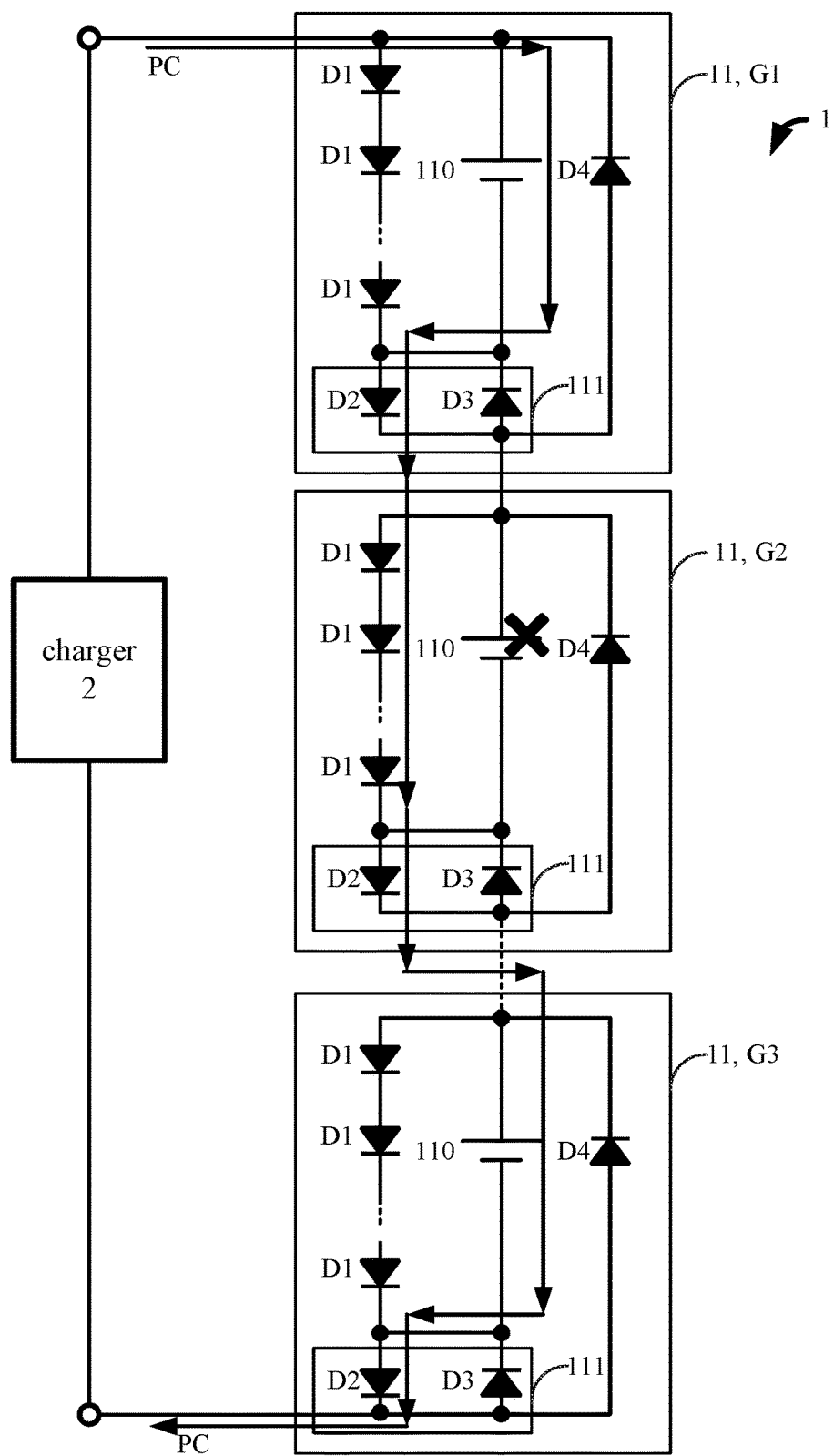
FIG. 5 is a schematic view of a charging path of the first embodiment when some battery units are disabled.

Please refer to FIG. 5, which is a schematic view of a charging path PC when some battery units 110 are disabled. Assume that the battery unit 110 of the second battery module G2 is disabled; when multiple battery modules 11 (the first battery module G1, the second battery module G2 and the third battery module G3) connected in series are configured at two ends of the charger 2, the charging path PC formed by the applied charging current is between the charger 2, the second diode D2 and the batter unit 110 of the first battery module G1, the first diode D1 and the second diode D2 of the second battery module G2, and the second diode D2 and the batter unit 110 of the third battery module G3.

Figure 6:
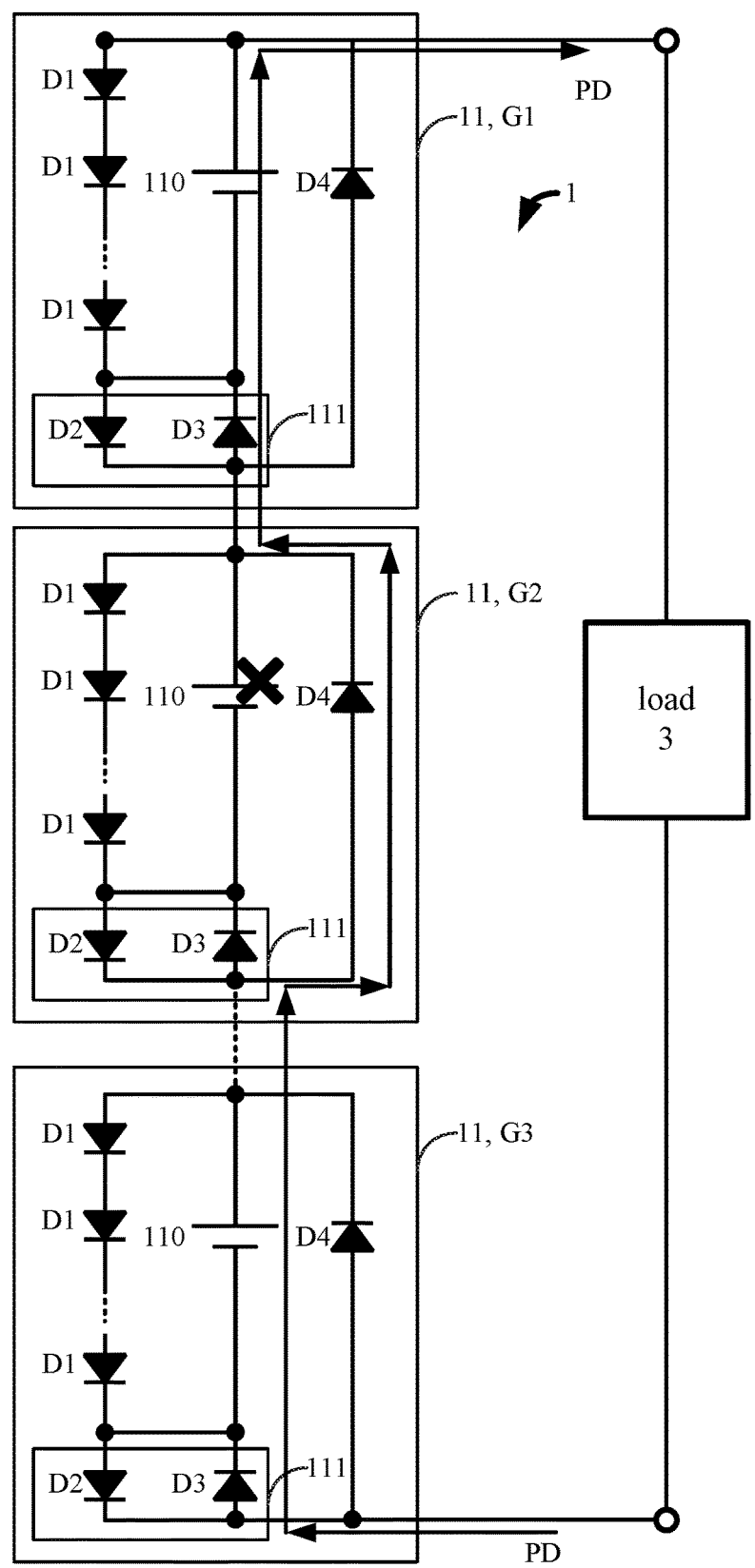
FIG. 6 is a schematic view of a discharging path of the first embodiment when some battery units are disabled.

Please refer to FIG. 6, which is a schematic view of a discharging path PD when some battery units 110 are disabled. Assume that the battery unit 110 of the second battery module G2 is disabled; when multiple battery modules 11 (the first battery module G1, the second battery module G2 and the third battery module G3) connected in series are configured at two ends of the load 3, the discharging path PD formed by the generated discharging current is between the load 3, the third diode D3 and the batter unit 110 of the third battery module G3, the fourth diode D4 of the second battery module G2, and the third diode D3 and the batter unit 110 of the first battery module G1.

When the batter unit 110 of the second battery module G2 is disabled, the third diode D3 can absorb or bear the forward bias voltage of the fourth diode D4 turned on so as to avoid that the forward bias voltage of the fourth diode D4 turned on is applied to the battery unit 110 of the second battery module G2, and avoid that a loop is formed between the fourth diode D4 and the battery unit 110 of the second battery module G2 to increase the temperature of the battery unit 110.

In practical engineering applications, the aforementioned battery assembly device 1 with charging and discharging protection can be applied to the battery assembly device of electric vehicles. The battery assembly device of most electric vehicles usually includes hundreds of batteries, and its input voltage will be higher than the operating voltage of electric vehicles. Accordingly, if one or two batteries of an electric vehicle malfunction, the battery assembly device 1 with charging and discharging protection according to the present invention can provide the operating voltage for the electric vehicle by the other batteries so as to make sure that the electric vehicle can work normally.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A battery assembly device with charging & discharging protection, comprising:
   a plurality of serially connected battery modules, each of the battery module further comprising:
   one or a plurality of battery units;
   a plurality of serially connected first diodes, connected in parallel with the battery unit;
   protection circuit, serially connected with the battery unit and configured between a first electronic connection point and a second electronic point of the battery module, the protection circuit further comprising a second diode and a third diode which are connected in parallel with each other, wherein electrode polarity of the second diode and electrode polarity of the third diode said second electronic connection point are different;
   a fourth diode, configured between the first electronic connection point and the second electronic connection point, wherein electrode polarity of the fourth diode and electrode polarity of the battery unit said first electronic connection point are different.

2. The device as claimed in claim 1, wherein electrode polarity of the first diode and electrode polarity of the battery unit at connection point are the same.

3. The device as claimed in claim 2, wherein sum of forwarding bias voltage of the first diodes are greater than voltage of the battery unit.

4. The device as claimed in claim 3, wherein number of the first diodes are used to configure sum of forwarding voltage of the first diodes to greater than voltage of the battery unit.

5. The device as claimed in claim 1, wherein the second diode is Schottky diode.

6. The device as claimed in claim 1, wherein the third diode is Schottky diode.

7. The device as claimed in claim 1, wherein the fourth diode is Schottky diode.

8. The device as claimed in claim 1, wherein electrode polarity of the third diode and electrode polarity of the fourth diode at connection point are the same.

9. The device as claimed in claim 1, wherein electrode polarity of the second diode and electrode polarity of the fourth diode at connection point are different.

10. The device as claimed in claim 1, wherein the protection circuit connects to negative polarity of the battery unit.

11. The device as claimed in claim 1, wherein the protection circuit connects to positive polarity of the battery unit.

* * * * *